(12) United States Patent
Jensen et al.

(10) Patent No.: US 6,701,080 B2
(45) Date of Patent: Mar. 2, 2004

(54) PHOTOGRAPHIC FILM CLEANING APPARATUS AND METHOD

(75) Inventors: Thomas D. Jensen, Rochester, NY (US); Dana A. Carlile, Webster, NY (US); Jan A. Chrisler, Rochester, NY (US); Scott M. Fitzgerald, Rochester, NY (US); Fred J. Oleson, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/202,803

(22) Filed: Jul. 25, 2002

(65) Prior Publication Data

US 2004/0018013 A1 Jan. 29, 2004

(51) Int. Cl.[7] .......................... G03B 17/24; B08B 11/02
(52) U.S. Cl. .......................................... 396/319; 15/100
(58) Field of Search .............................. 396/319, 661; 15/100; 355/30

(56) References Cited

U.S. PATENT DOCUMENTS

| | | | | |
|---|---|---|---|---|
| 2,814,966 A | * | 12/1957 | Crossley | 359/469 |
| 5,737,653 A | * | 4/1998 | Tokui | 396/319 |
| 5,841,516 A | * | 11/1998 | Miyawaki et al. | 355/30 |
| 5,903,787 A | | 5/1999 | Farling et al. | 396/320 |
| 5,950,026 A | * | 9/1999 | Jessop | 396/319 |
| 5,956,129 A | * | 9/1999 | DeCook | 355/40 |
| 6,101,069 A | | 8/2000 | Bryant et al. | 360/128 |
| 6,229,965 B1 | * | 5/2001 | Ito et al. | 396/319 |

FOREIGN PATENT DOCUMENTS

JP          8-36719          2/1996

* cited by examiner

*Primary Examiner*—Christopher Mahoney
(74) *Attorney, Agent, or Firm*—David A. Novais

(57) ABSTRACT

A film cleaning apparatus and method includes a cleaning member with at least one self-loading cleaning surface or pad mounted directly over the film, such that when assembled, the cleaning surface or pad applies a force onto the film. The cleaning member of the present invention is preferably provided upstream of a magnetic head with respect to a direction of travel of the film in an imaging apparatus. The cleaning member of the present invention contacts the film with a sufficient load or force to clean the film and preferably, the opposing magnetic tracks of the film, prior to the film passing the magnetic heads or reaching the magnetic head area.

30 Claims, 7 Drawing Sheets

PHOTOGRAPHIC FILM CLEANING APPARATUS AND METHOD

FIELD OF THE INVENTION

The present invention relates to a cleaning apparatus and method for cleaning photographic films. More specifically, the present invention relates to a cleaning apparatus and method for cleaning photographic film having a magnetic surface such as APS film.

BACKGROUND OF THE INVENTION

Photographic films such as APS film utilize a layer of essentially transparent magnetic particles on the non-emulsion side of the film support to record customer photographic information. This information can pertain to a customer's desired output print size for each frame, along with specific camera settings and lighting conditions at the time of exposure.

After the film has been exposed by the customer and the frame information recorded to the magnetic layer by the camera, the film is delivered to the photofinisher for processing. During photoprocessing, the photofinisher sends the film through photoprocessing chemistry that develops the image on the film. In some cases this photoprocessing chemistry can leave a residue on the magnetic side of the film. During a subsequent scan and print operation, this residue comes into contact with the APS magnetic read/write head of an imaging assembly such as a scanner or printer. The residue on the film continuously transfers to the magnetic head and if this residue transfers to a gap area between the magnetic head and the film, a spacing loss can occur. More specifically, the thicker the residue accumulation that occurs near the gap of the magnetic head, the lower the resulting read back voltage of the magnetic head. Eventually, the residue build up can become thick enough (2 microns or higher) that the read back voltage will drop below an acceptable level. At this point, the scanner/printer will not be able to accurately read the magnetic information that the customer's camera has written on the film.

One way that this issue has been addressed is by increasing the pressure on the magnetic head to abrade the residue from the gap area of the magnetic head. However, this technique results in a very expensive sub-assembly and is not effective against highly contaminated film. Further, the increase of the pressure of the magnetic head on the film tends to adversely effect the operation and longevity of the magnetic head.

SUMMARY OF THE INVENTION

The present invention provides for a photographic film cleaning apparatus and method which utilizes self-loading cleaning surfaces mounted directly over the photographic film, that when assembled, applies a given force on the film. The cleaning surfaces of the apparatus, in conjunction with the required pre-load force applied by the apparatus, supplies sufficient pressure to the photographic film so that the photographic film is cleaned prior to entering a magnetic head area.

The present invention relates to an apparatus for cleaning a photographic film located at a film conveying path or film track of an imaging assembly. The apparatus comprises a plate member, and a cleaning member mounted on the plate member in a cantilevered manner. The cleaning member includes a base and at least one arm that extends from the base. The arm comprises a cleaning surface which abuts against a surface of the film and provides a force on the film at the film conveying path to clean the film prior to the film arriving at a magnetic head area of the imaging assembly.

The present invention further relates to a cleaning assembly for photographic film which comprises a plate member, and at least one leaf spring mounted on the plate member in a cantilevered manner and extending from the plate member. The leaf spring has a cleaning surface thereon and is bent at an angle which causes a deflection of the spring when the cleaning surface abuts against a film surface to be cleaned. The cleaning surface removes residue from a magnetic surface of the film as the film is conveyed past the cleaning surface.

The present invention further relates to a magnetic head and cleaning unit for an imaging assembly which comprises at least one magnetic head provided in the imaging assembly relative to a film conveying path to contact a surface of the film as the film travels along the conveying path; and at least one leaf spring provided in the imaging assembly relative to the film conveying path at a position upstream of the at least one magnetic head with respect to a direction of travel of the film along the conveying path. The leaf spring has a cleaning surface thereon and is bent at an angle which causes a deflection of the spring when the cleaning surface abuts against the film to remove residue from a magnetic surface of the film prior to the film reaching the magnetic head.

The present invention further relates to a method of cleaning photographic film in a film conveying path of an imaging assembly. The method comprises the steps of mounting a leaf spring having a cleaning surface thereon on a plate of a magnetic head unit of an imaging assembly, with the leaf spring being mounted upstream of a magnetic head of the unit with respect to a direction of travel of film along the conveying path; and bending the leaf spring at an angle which causes a deflection of the leaf spring when the cleaning surface abuts against film in the film conveying path, to remove residue from a magnetic surface of the film prior to the film reaching the magnetic head.

DETAILED DESCRIPTION OF THE INVENTION

Figure 1:
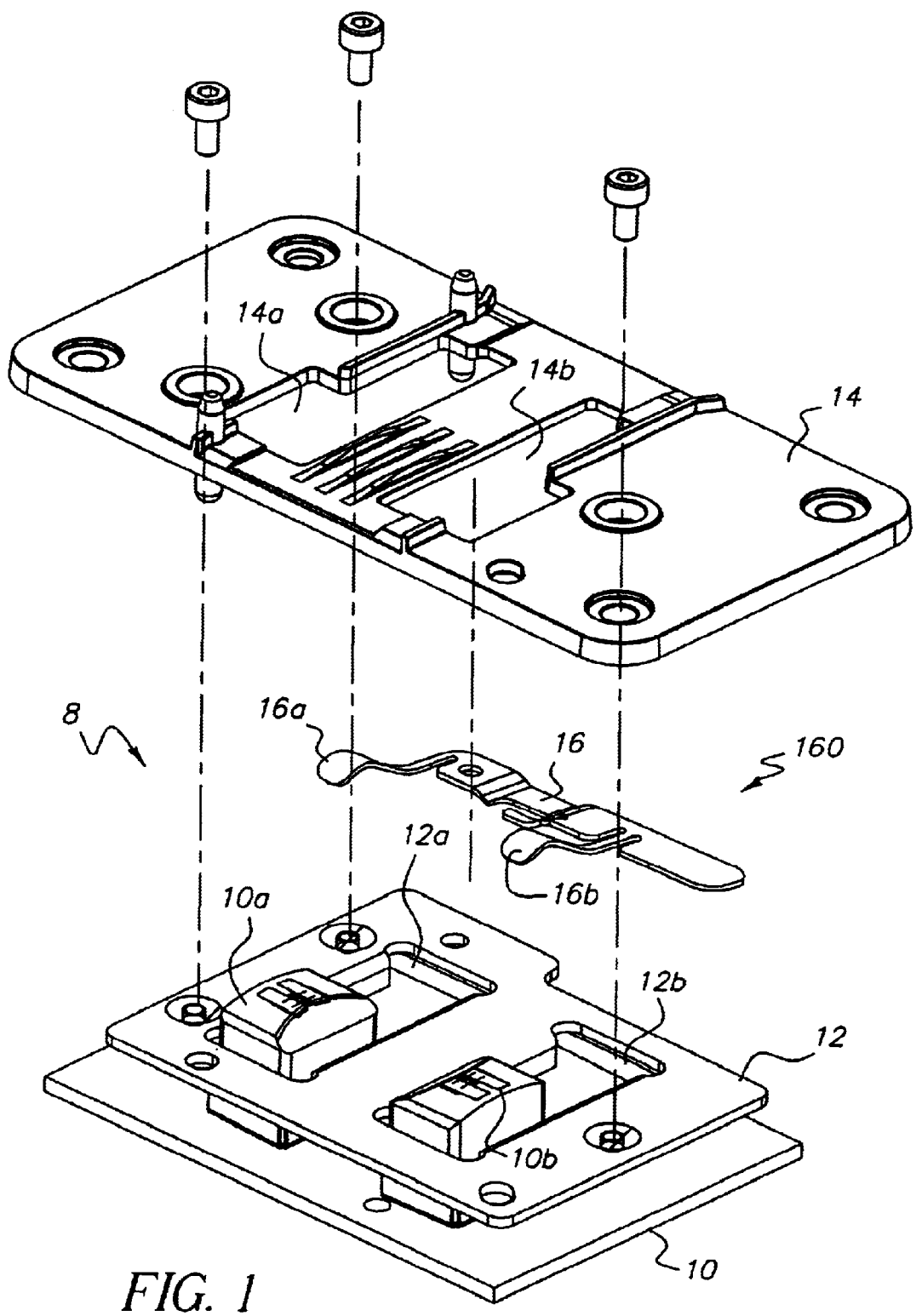
FIG. 1 is an exploded view of a magnetic head and a cleaning member in accordance with the present invention.

Referring now to the drawings, wherein like reference numerals represent identical or corresponding parts throughout the several views, FIG. 1 is an exploded view of a magnetic head and cleaning unit or a magnetic head module 8 in accordance with a first feature of the present invention.

Unit 8 is preferably a part of an imaging assembly such as a printer or scanner. As shown in FIG. 1, unit 8 includes a first plate member 10 onto which is mounted first and second magnetic heads 10a, 10b. Magnetic heads 10a, 10b are known magnetic heads utilized for reading/writing on the opposing magnetic tracks of APS film. Magnetic heads 10a, 10b are positioned such that first magnetic head 10a corresponds to the magnetic track or read/write area on a first side or edge of the film, with the first magnetic head having a width that corresponds to the magnetic track or read/write area on the first side or edge of the film; and the second magnetic head 10b corresponds to the magnetic track or read/write area on a second side or edge of the magnetic film, with the second magnetic head having a width that corresponds to the magnetic track or read/write area on the second side or edge of the film. Unit 8 further includes an intermediate plate 12 having openings 12a, 12b for the passage of magnetic heads 10a, 10b therethrough, and a second plate member 14, with both plate members 12 and 14 being substantially parallel to plate number 10. A cleaning member 160 as shown in FIG. 1 includes a base 16 with a first arm or leaf spring 16a and a second arm or leaf spring 16b extending therefrom.

Figure 2:
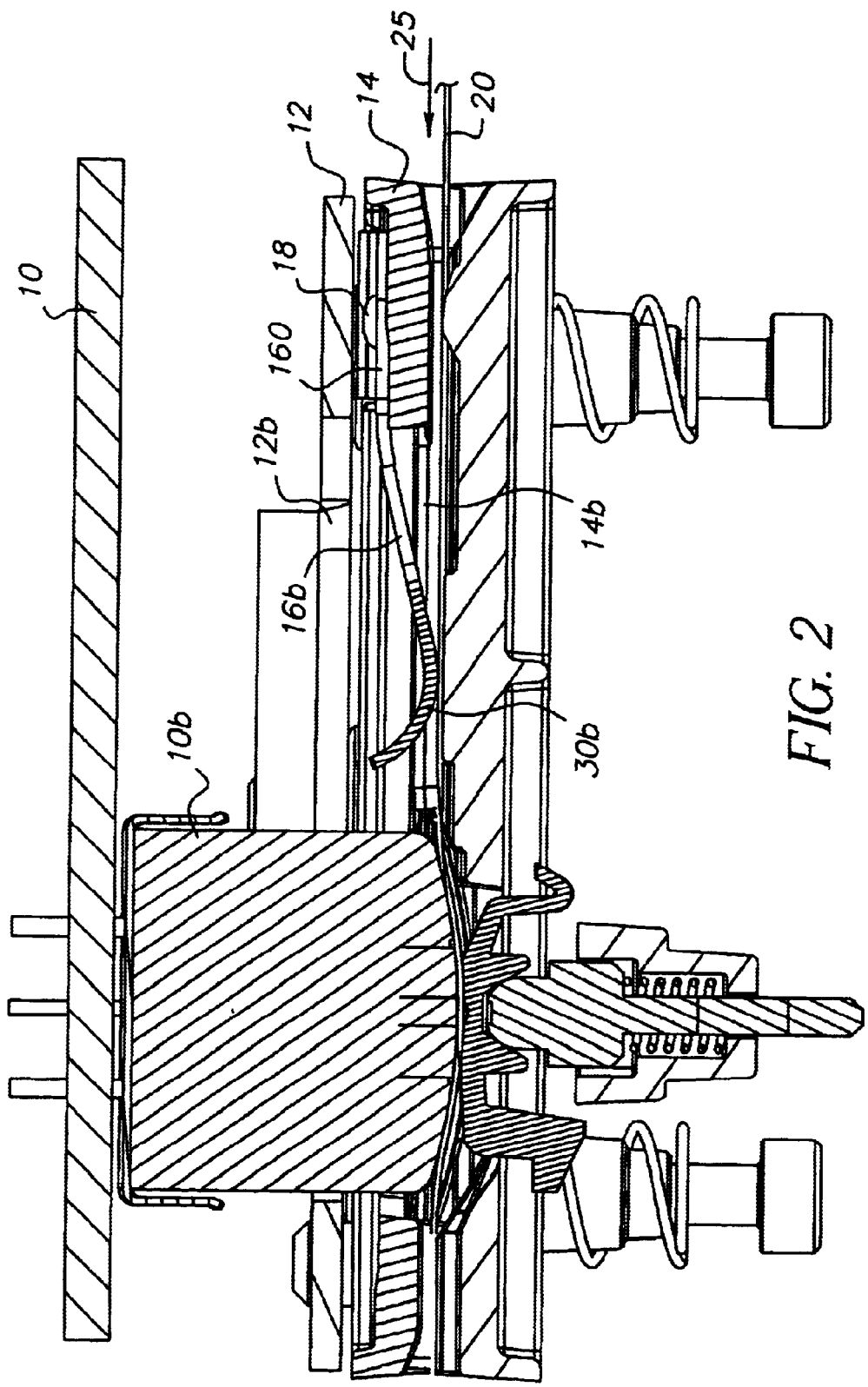
FIG. 2 is a side view of the magnetic head and cleaning member of the present invention in relation to the passage of photographic film.

As illustrated in FIG. 2, cleaning member 160 is mounted or attached to a first surface of plate 14 by way of, for example, a bolt 18 which extends through base 16. It is noted that the present invention is not limited to a bolt mounted cleaning member as shown in FIG. 2, and any method of attachment such as, for example, welding, gluing, etc. is possible within the context of the present invention. As illustrated in FIG. 2, base 16 is mounted to plate member 14 in such a manner that cleaning member 160 is mounted to plate member 14 in a cantilevered fashion. As also shown in FIG. 2, a free end of cleaning member 160, and more specifically, arms or leaf springs 16a, 16b extend from base member 16 and pass through respective openings 14a, 14b in plate member 14.

Figure 3:
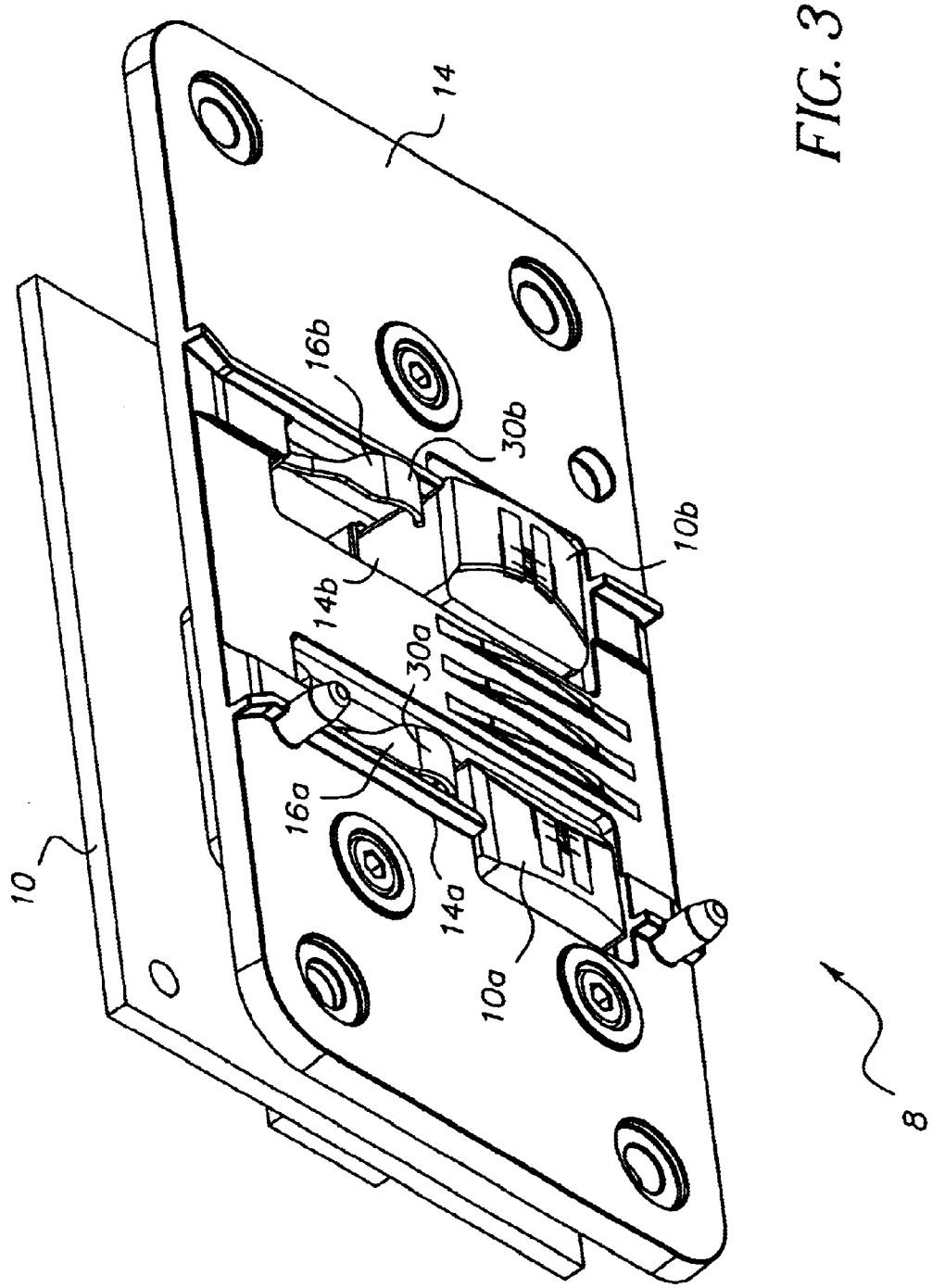
FIG. 3 is a further perspective view of the magnetic head and cleaning member in accordance with the present invention.

As shown in FIG. 3, openings 14a and 14b are sized to permit both magnetic heads 10a, 10b and arms 16a, 16b to pass therethrough. More specifically, as shown in FIG. 2 and FIG. 3, magnetic head 10a and arm 16a pass through opening 14a, while magnetic head 10b and arm 16b pass through opening 14b.

Unit 8 is mounted in an imaging assembly such as, for example, a scanner or printer, in a manner in which a photographic film 20 (FIG. 2) travels in a film track or conveying path in the direction of arrow 25. With this arrangement, conveying film 20 is cleaned by cleaning member 160 and specifically, arms or leaf springs 16a and 16b prior to the film reaching magnetic heads 10a, 10b. That is, magnetic heads 10a and 10b are located downstream of arms or leaf springs 16a, 16b of cleaning member 160, with respect to a conveying direction of photosensitive film in the imaging assembly.

As described above, cleaning member 160 includes base 16 and arms or leaf springs 16a, 16b. Each of arms or leaf springs 16a, 16b include a cleaning surface 30a, 30b at a lower portion of arms or leaf springs 16a, 16b as shown in FIG. 3. In a feature of the invention, arms or leaf springs 16a, 16b are bent at an angle to provide for a desired load on photosensitive film 20 as shown in FIG. 2. The angle can be between 6 degrees and 15 degrees, however, the angle is adjustable based on the amount of load desired.

When the unit is assembled as shown in FIG. 2, the contact between the film surface and arms or leaf springs 16a and 16b and specifically, cleaning surfaces 30a, 30b of arms or leaf springs 16a, 16b, impart a deflection to arms or leaf springs 16a, 16b and a resulting load on the film track and therefore the film in the film track. Thus, when film 20 is thrust along a film conveying path or film track in a direction as shown by arrow 25 (FIG. 2), the film slides between the film conveying path and arms 16a, 16b, and specifically, cleaning surfaces 30a, 30b of arms 16a, 16b. Cleaning surfaces 30a, 30b remove residue such as processor residue from the magnetic side of the film before that portion of the film reaches the magnetic head. Arms or leaf springs 16a, 16b are located to extend over the opposing magnetic tracks or magnetic read/write areas located on each side of photosensitive film such as APS film. Further, cleaning surfaces 30a, 30b of arms 16a, 16b are sized with respect to their width to substantially cover and therefore clean all the magnetic tracks or all of the magnetic read/write areas on the film.

Figure 4:
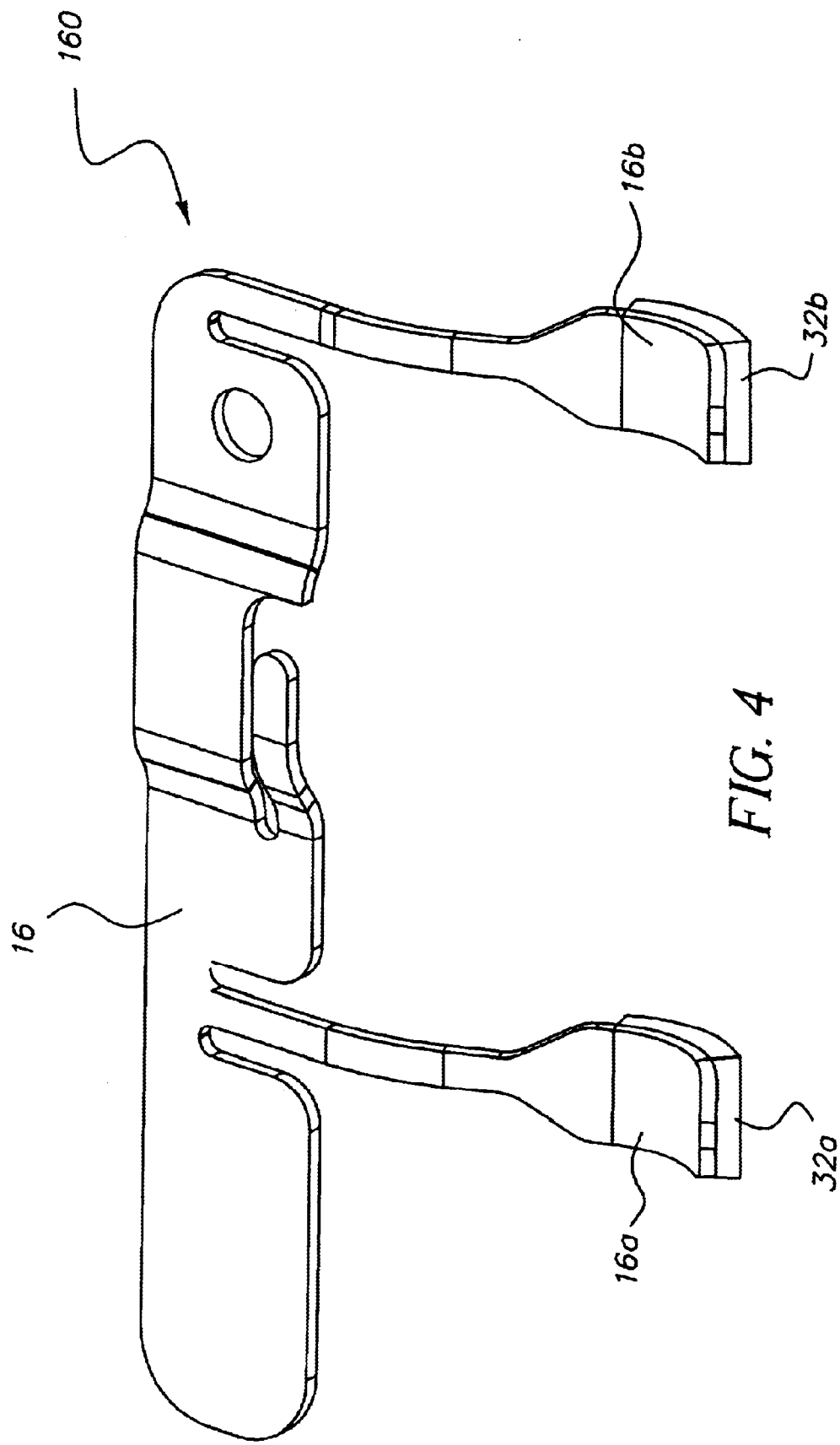
FIG. 4 illustrates the leaf spring of the cleaning member of the present invention.

In a feature of the invention, cleaning surfaces 30a, 30b of arms 16a, 16b are abutted against or contact the opposing magnetic tracks of the film to clean the film prior to the film reaching the magnetic heads. As a further option, arms or leaf springs 16a, 16b can include cleaning pads 32a, 32b attached to the ends of arms or leaf springs 16a, 16b as shown in FIG. 4. Therefore, cleaning pads 32a, 32b will contact the film and perform the cleaning function. The thickness of cleaning pads 32a, 32b or optionally cleaning surfaces 30a, 30b (in the embodiment without cleaning pads) can be varied depending upon the amount of deflection and load desired. If cleaning pads 32a, 32b are used, they can be glued or adhered to the end of arms 16a, 16b. Cleaning pads 32a, 32b or optionally, cleaning surfaces 30a, 30b can be made of a stainless steel material, calcium, titanate, zirconia, or aluminum. However, the present invention is not limited to these material selections, and numerous materials which achieve the purpose of cleaning the photosensitive film without adversely reacting with the film can be utilized within the context of the present invention.

Therefore, the unit of the present invention can be used in an imaging assembly such as for example, a scanner or printer, where it is desired to read/write magnetic information from/to film. In such a unit, cleaning member 116 is positioned upstream of the magnetic heads, so as to remove residue from the film prior to that portion of the film reaching the magnetic heads. Further, cleaning member 160 includes leaf springs or arms 16a, 16b that are loaded so as to abut against the passing film to achieve the cleaning function. To provide for the noted load or force, the arms or leaf springs 16a, 16b are mounted in a cantilevered manner and bent at an angle, such that a free end of the arm or leaf spring applies a load against the film. With respect to the force or load applied to the film by the cleaning member of the present invention, the load or force needs to be sufficient to clean the surface of the film. It is noted that the load or force cannot be too strong since this would adversely affect the movement of the film and possibly damage the film. At the same time, the force or load cannot be low enough where the cleaning surfaces or pads would not properly clean the surface of the film. As a non-limiting example, Applicants note that a preferred range for the load or force on the film by the cleaning member can be between 80 grams force to 200 grams force. However, this could be modified based on the equipment that the cleaning member is used in.

Figure 5:
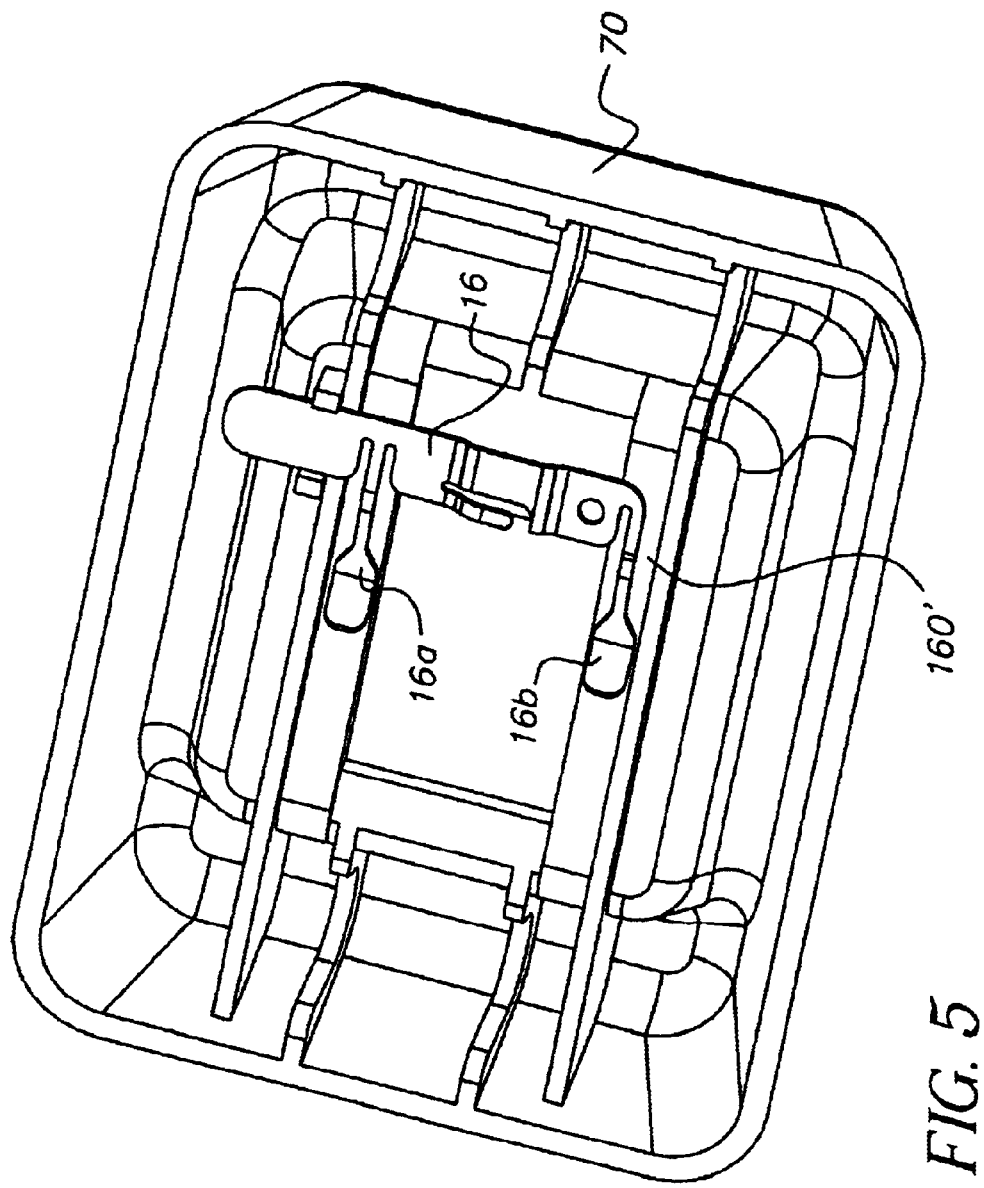
FIG. 5 is a schematic view of the cleaning member of the present invention located in a camera casing.

Although the present invention has been described with reference to utilization in an imaging assembly such a scanner or printer, the cleaning member of the present invention can also be utilized within a camera. For example, a cleaning member 160' as illustrated in FIG. 5, can be mounted within a back casing 70 of a photographic camera. In this embodiment, like the already described embodiment, cleaning member 160' would be provided upstream with respect to a direction of film movement of a magnetic head in the camera, for the purpose of cleaning the opposing magnetic tracks of the photographic film prior to reaching the magnetic head.

Figure 6:
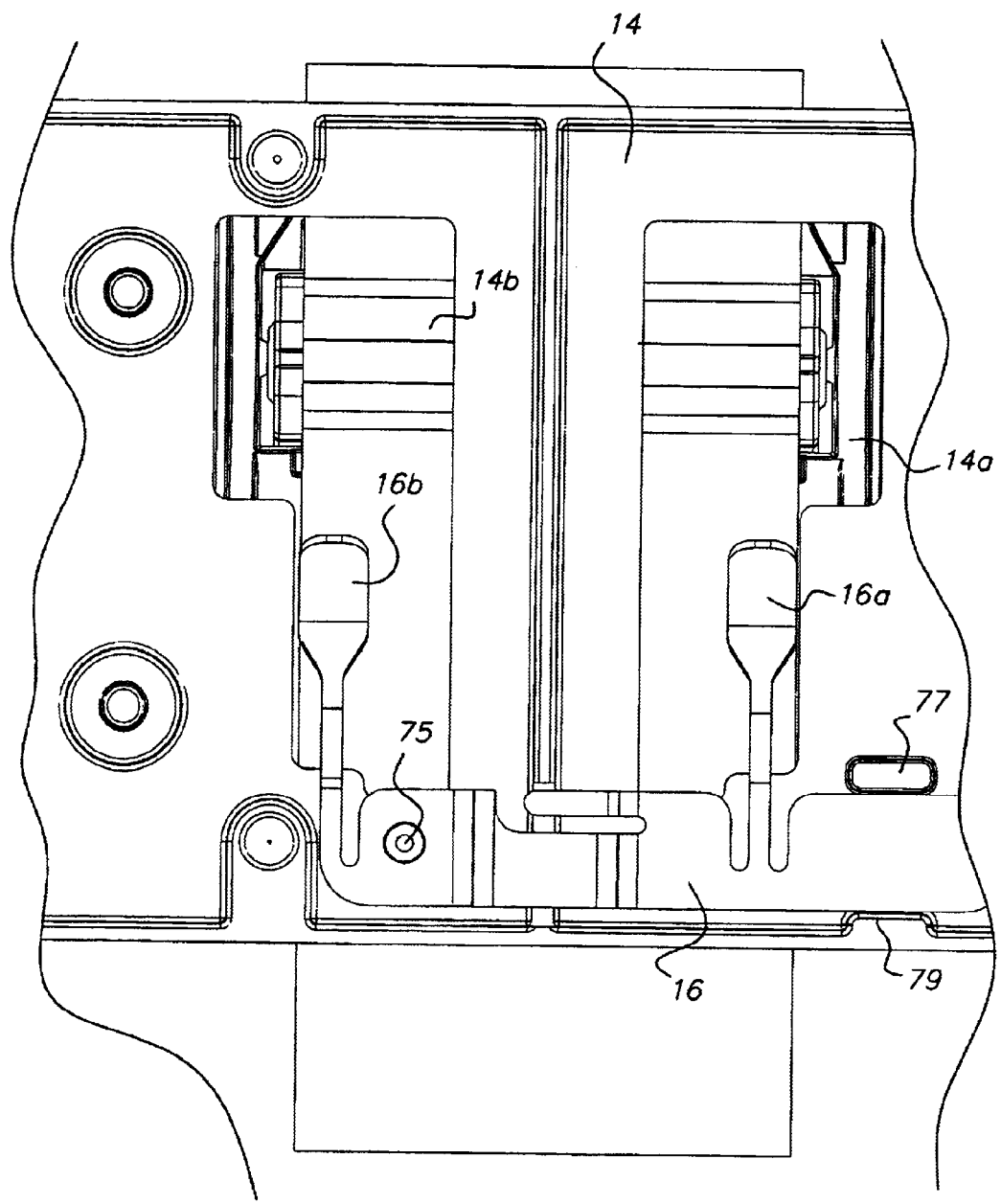
FIG. 6 is a top view of the magnetic head and cleaning member.

Further, for flexibility and mounting purposes, as shown in FIG. 6, base 16 of cleaning member 160 preferably includes a through hole 75 for the passage of a bolt therethrough for attachment to a surface of plate member 14. A second end of base 16 is essentially friction fitted or inserted within protruding members 77 and 79 as also shown in FIG. 6. This arrangement facilitates the replacement of cleaning member 160 when the cleaning surfaces or pads wear out. Additionally, it provides flexibility for the movement of arms 16a, 16b to accommodate for the movement of film along the film track or film conveyance path.

In a further feature of the invention, leaf springs 16a, 16b are designed to undergo a torsional rotation in both directions during use. This is advantageous in that it permits the cleaning surfaces or pads to follow the contour of the film during use to assure film cleaning contact across the entire recording track or surface regardless of any film pertubations.

Figure 7:
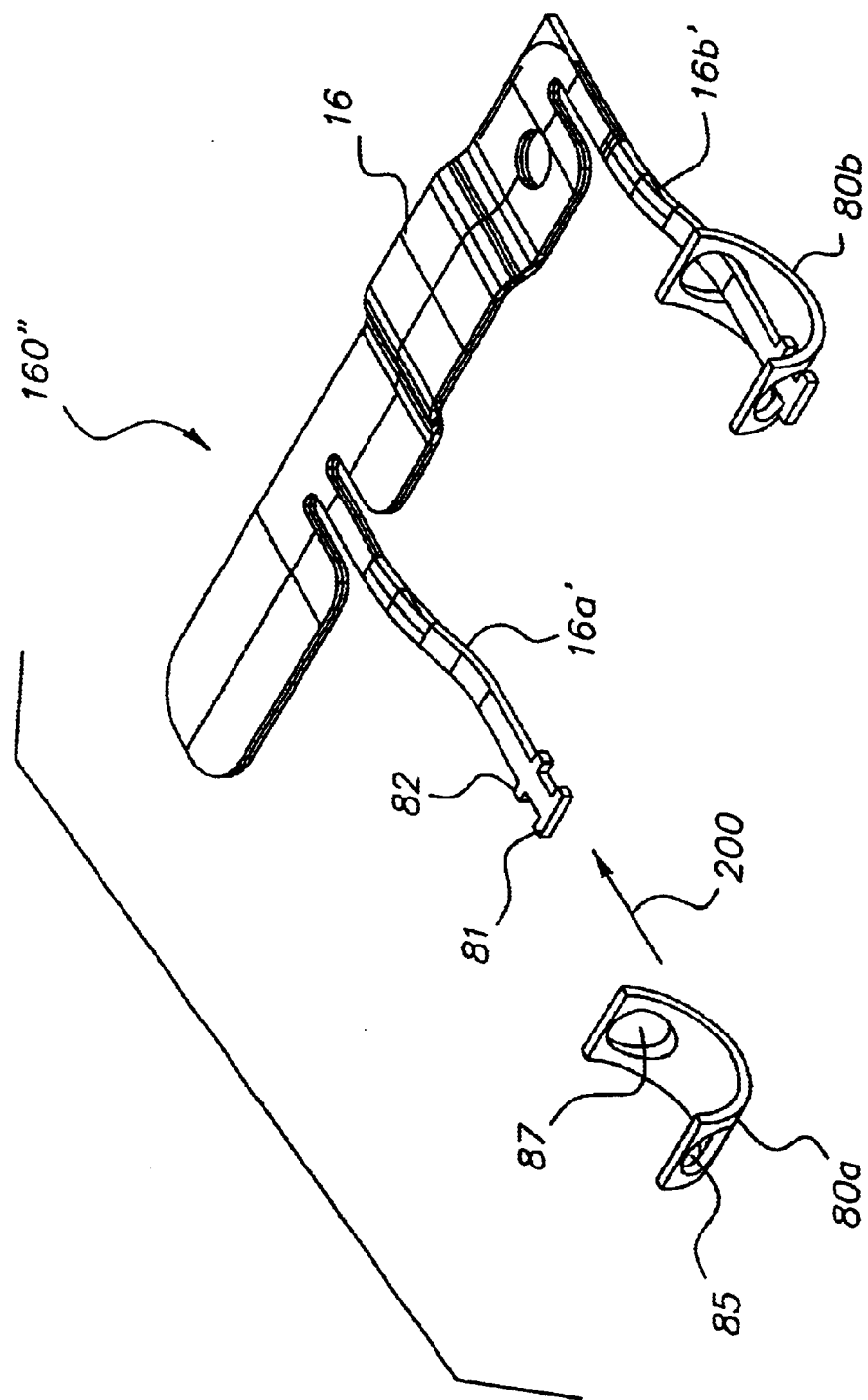
FIG. 7 is an alternate embodiment of the cleaning member of the present invention.

A further embodiment of the cleaning member of the present invention is illustrated in FIG. 7. In the embodiment of FIG. 7, a cleaning member 160" is designed to provide for various degrees of movement of cleaning pads to assure that the cleaning pads are always square on the surface of the film. The embodiment of FIG. 7 basically includes automatic orienting cleaning pads and comprises a base member 16 as in the first embodiment, and arms or leaf springs 16a' and 16b'. Arms or leaf springs 16a' and 16b' each includes first and second fingers 81 and 82 as shown. Cleaning pads 80a, 80b are basically U-shaped in structure and include aligned through-holes or openings 85 and 87. Cleaning pads 80a, 80b are respectively attached to arms 16a' and 16b' by sliding pads 80a, 80b over the respective arms 16a', 16b', such that arms 16a', 16b' pass through opening 87 and opening 85. In a preferred mounting arrangement, pads 80a and 80b are mounted on arms 16a', 16b' in a direction 200 in a manner in which opening 85 is positioned between first and second fingers 81 and 82. In this way, cleaning pads 80a, 80b are captured onto arms 16a', 16b' by the force of the cleaning pads themselves when top plate 14 and the bottom plate 10 (FIG. 1) are assembled together. The arrangement of FIG. 7 permits cleaning pads 80a, 80b to rotate around the axis of arms or leaf springs 16a', 16b', and follow the contour of the film to assure film cleaning contact across the entire recording track area of the film regardless of any film pertubations. Cleaning pads 80a and 80b can be made of any of the materials discussed above with respect to the cleaning surfaces and cleaning pads. Further, leaf springs or arms 16a', 16b' can be adjusted based on the amount of force desired on the film.

Although the pads or cleaning surfaces of the described embodiments are shown as being substantially square or oval-like, any configuration of the cleaning pads or cleaning surfaces is possible within the context of the present invention. For example, the cleaning pads could be semi-circular. In a feature of the invention, the cleaning pads or surfaces are preferably cylindrically shaped to minimize and/or avoid damaging the film or the film perforations.

Also, the thickness of the cleaning surfaces or cleaning pads can be varied depending upon the amount of deflection and load desired. Also, the leaf springs can be bent at any angle depending on the amount of load desired, and preferably, between and angle of 6 degrees and 15 degrees. Further, the width of the cleaning pads or cleaning surfaces is such that they cover the entire width or substantially the entire width of the magnetic area or recording track. In a feature of the invention, it is preferred that the cleaning pads or surfaces overhang both cross track edges of the film perforation. This helps to minimize damage to the film perforation in the film transport direction.

Further, although two arms or leaf springs and cleaning surfaces are shown, the present invention is not limited thereto. It is noted that the present invention can be practiced with more than two arms or leaf springs having cleaning surfaces or pads, or a single arm or leaf spring with a cleaning surface or pad, to clean a desired magnetic read/write recording area.

Accordingly, the present invention provides for a photographic film cleaning apparatus and method which can utilize at least one and preferably two self-loading cleaning surfaces or pads mounted directly over the film, that when assembled, applies a given force onto the film. The contact surfaces of the cleaning member, in conjunction with the required pre-load supplies sufficient pressure to the film so that the film is cleaned prior to entering the magnetic head area of an imaging assembly such as a scanner, printer or camera.

The invention has been described in detail with particular reference to certain preferred embodiments thereof, but it will be understood that variations and modifications can be effected within the spirit and scope of the invention.

What is claimed is:

1. An apparatus for cleaning a photographic film located at a film conveying path of an imaging assembly, the apparatus comprising:
    a plate member; and
    a cleaning member mounted on said plate member in a cantilevered manner to provide a force on said film sufficient to clean a surface of said film, said cleaning member including a base and at least one arm extending from said base, said arm comprising a cleaning surface which abuts against the surface of said film with said force to clean the film prior to the film arriving at a magnetic head area of the imaging assembly.

2. An apparatus according to claim 1, wherein said at least one arm is sized to abut against one edge area of said film which includes magnetic tracks.

3. An apparatus according to claim 2, further comprising a second arm extending from said base and extending from said plate member in a cantilevered manner, said second arm being sized to abut against a second edge area of said film which includes magnetic tracks.

4. An apparatus according to claim 1, wherein said plate member comprises at least one opening aligned with said at least one arm, said cleaning surface of said at least one arm extending through said opening of said plate member to abut against the film to be cleaned.

5. An apparatus according to claim 1, wherein said cleaning surface comprises stainless steel, calcium, titanate, zirconia or alumina.

6. An apparatus according to claim 1, wherein said cleaning surface comprises a cleaning pad attached to said at least one arm.

7. An apparatus according to claim 6, wherein said cleaning pad is made of stainless steel, calcium titanate, zirconia or alumina.

8. An apparatus according to claim 1, wherein said cleaning surface comprises a U-shaped member which is movably mounted on an end of the at least one arm.

9. An apparatus according to claim 1, wherein said imaging assembly is a scanner.

10. An apparatus according to claim 1, wherein said imaging assembly is a printer.

11. An apparatus according to claim 1, wherein said imaging assembly is a camera.

12. An apparatus for cleaning a photographic film located at a film conveying path of an imaging assembly, the apparatus comprising:
- a plate member; and
- a cleaning member mounted on said plate member in a cantilevered manner, said cleaning member including a base and at least one arm extending from said base, said arm comprising a cleaning surface which abuts against a surface of said film and provides a force on said film at said film conveying path to clean the film prior to the film arriving at a magnetic head area of the imaging assembly;

wherein:
- said plate member comprises at least one opening aligned with said at least one arm, said cleaning surface of said at least one arm extending through said opening of said plate member to abut against the film to be cleaned; and
- said opening of said plate member is further aligned with a magnetic head in the magnetic head area of said imaging assembly, said opening being sized to permit the magnetic head to pass therethrough and contact the film after the film has been cleaned by said cleaning surface of said at least one arm.

13. An apparatus for cleaning a photographic film located at a film conveying path of an imaging assembly, the apparatus comprising:
- a plate member; and
- a cleaning member mounted on said plate member in a cantilevered manner, said cleaning member including a base and at least one arm extending from said base, said arm comprising a cleaning surface which abuts against a surface of said film and provides a force on said film at said film conveying path to clean the film prior to the film arriving at a magnetic head area of the imaging assembly;
- wherein a first side of said base is attached to said plate member by way of a bolt and a second side of said base is inserted between protruding members on said plate member.

14. A cleaning assembly for photographic film, the cleaning assembly comprising:
- a plate member; and
- a leaf spring mounted on said plate member in a cantilevered manner and extending from said plate member, said leaf spring having a cleaning surface thereon and being bent at an angle which causes a deflection of the leaf spring when the cleaning surface of the leaf spring abuts against a film surface to be cleaned, said cleaning surface removing residue from a magnetic surface of said film as said film is conveyed past said cleaning surface.

15. A cleaning assembly according to claim 14 wherein said cleaning surface comprises stainless steel, calcium titanate, zirconia or alumina.

16. A cleaning assembly according to claim 14, wherein said cleaning surface comprises a cleaning pad attached to said an end of said leaf spring.

17. A cleaning assembly according to claim 16, wherein said cleaning pad is made of stainless steel, calcium titanate, zirconia or alumina.

18. A magnetic head and cleaning unit for an imaging assembly, the unit comprising:
- at least one magnetic head provided in said imaging assembly relative to a film conveying path to contact a surface of film as said film travels along the conveying path; and
- at least one leaf spring provided in said imaging assembly relative to said film conveying path at a position upstream of said at least one magnetic head with respect to a direction of travel of said film along the conveying path, said leaf spring having a cleaning surface thereon and being bent at an angle which causes a deflection of the leaf spring when the cleaning surface of the leaf spring abuts against the film, to remove residue from a magnetic surface of said film prior to the film reaching the magnetic head.

19. A unit according to claim 18 wherein said cleaning surface comprises stainless steel, calcium titanate, zirconia or alumina.

20. A unit according to claim 18, wherein said cleaning surface comprises a cleaning pad attached to said an end of said leaf spring.

21. A unit according to claim 20, wherein said cleaning pad is made of stainless steel, calcium titanate, zirconia or alumina.

22. A unit according to claim 18, wherein said imaging assembly is a scanner or printer.

23. A unit according to claim 18, wherein said imaging assembly is a camera.

24. A magnetic head and cleaning unit for an imaging assembly, the unit comprising:
- at least one magnetic head provided in said imaging assembly relative to a film conveying path to contact a surface of film as said film travels along the conveying path; and
- at least one leaf spring provided in said imaging assembly relative to said film conveying path at a position upstream of said at least one magnetic head with respect to a direction of travel of said film along the conveying path, said leaf spring having a cleaning surface thereon and being bent at an angle which causes a deflection of the spring when the cleaning surface abuts against the film, to remove residue from a magnetic surface of said film prior to the film reaching the magnetic head;
- wherein said at least one magnetic head is mounted on a first plate member and said leaf spring is mounted in a cantilevered manner on a second plate member which is substantially parallel to the first plate member.

25. A unit according to claim 24, wherein said second plate member comprises a opening aligned with said leaf spring and said magnetic head, such that said magnetic head and said leaf spring extend through said opening to contact said film at said conveying path.

26. A method of cleaning photographic film in a film conveying path of an imaging assembly, the method comprising the steps of:

mounting a leaf spring having a cleaning surface thereon on a plate member of a magnetic head unit of an imaging assembly, said leaf spring being mounted upstream of a magnetic head of said unit with respect to a direction of travel of film along the conveying path; and bending the leaf spring the leaf spring at an angle which causes a deflection of the leaf spring when the cleaning surface of the leaf spring abuts against film in said film conveying path, to remove residue from a magnetic surface of said film prior to the film reaching the magnetic head.

27. A method according to claim 26, wherein said cleaning surface comprises stainless steel, calcium, titanate, zirconia or alumina.

28. A method according to claim 26, wherein said cleaning surface comprises a cleaning pad attached to said an end of said leaf spring.

29. A method according to claim 28, wherein said cleaning pad is made of stainless steel, calcium titanate, zirconia or alumina.

30. A method according to claim 26, wherein said leaf spring is removable.

* * * * *